May 15, 1962 J. R. WALLACE 3,034,273
LIQUID COLLECTING VACUUM CLEANER
Filed April 6, 1959 2 Sheets-Sheet 1

INVENTOR.
JAMES R. WALLACE
BY George H. Baldwin
ATTORNEY

May 15, 1962  J. R. WALLACE  3,034,273
LIQUID COLLECTING VACUUM CLEANER
Filed April 6, 1959  2 Sheets-Sheet 2

INVENTOR.
JAMES R. WALLACE
BY
George H. Baldwin
ATTORNEY

United States Patent Office 3,034,273
Patented May 15, 1962

3,034,273
LIQUID COLLECTING VACUUM CLEANER
James R. Wallace, 3044 Detroit Circle S.,
Jacksonville, Fla.
Filed Apr. 6, 1959, Ser. No. 804,313
6 Claims. (Cl. 55—318)

This invention relates to vacuum cleaners and particularly to means for adapting a dry dust collecting household tank type vacuum cleaner for use in drawing up and collection of liquids.

A general object of the invention is to provide an improved vacuum cleaner arrangement adapted to the drawing up and collection of liquids.

A general object of the invention is to provide an improved vacuum cleaner arrangement adapted to the drawing up and collection of liquids.

A further object of the invention is to provide an adapter for vacuum cleaners which enables the use of cleaners for the collection of liquids which otherwise are limited in their use to the collection of dry particles of dust and dirt.

Another object of the invention is to provide a device which may be employed with conventional household tank type vacuum cleaners and which enables one to use such cleaners for drawing up and collecting liquids from floors and other surfaces which are preferably cleaned by liquids.

A particular object is to provide an inexpensive liquid-impervious adapter bag, for a household tank type vacuum cleaner which is limited in its use to the drawing up and collection of dirt, dust particles and the like unaccompanied by liquids, useful in the cleaner to permit the use of such cleaner for the drawing up and collection of liquids from floors and other surfaces, which, when employed with such cleaner, is hidden from external view and thereby avoids any change in the external appearance of the cleaner, which is so arranged as to facilitate emptying and disposal of collected liquids, and which is sufficiently inexpensive as to be disposable, yet which may be re-used indefinitely, if desired.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
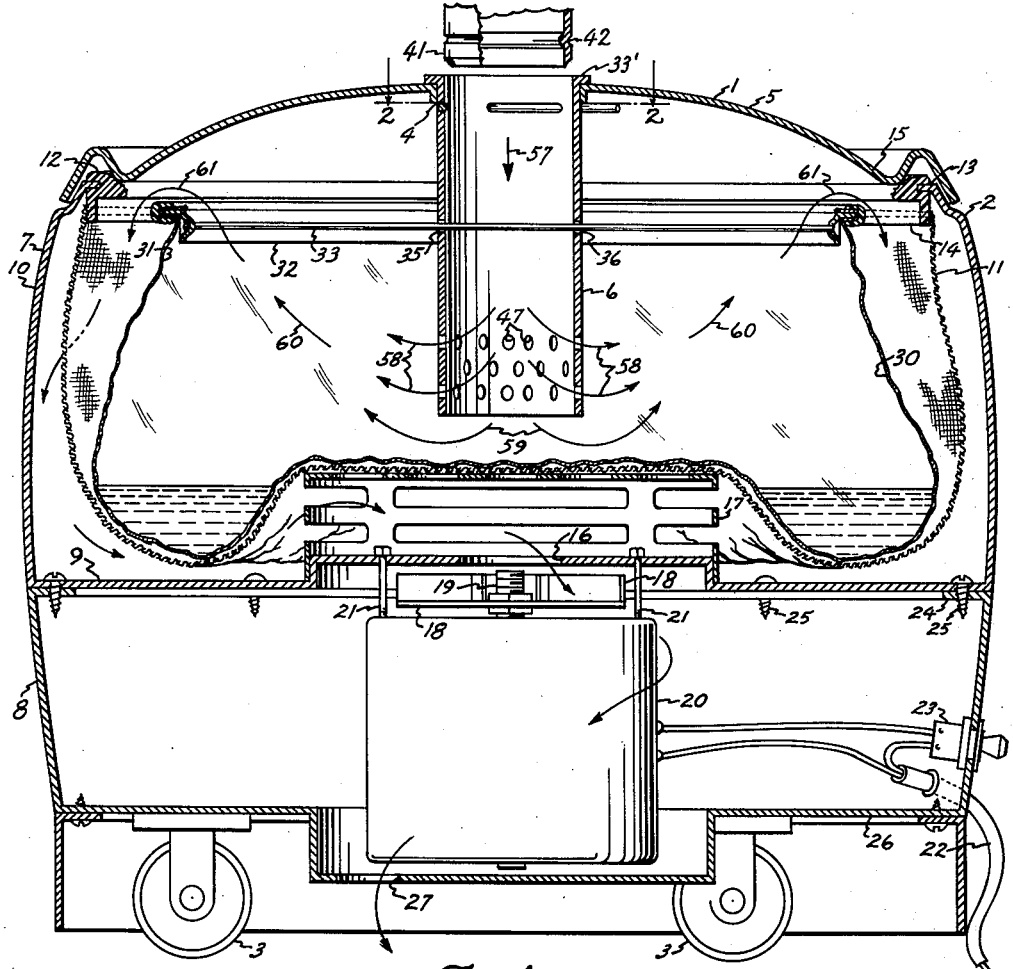
FIG. 1 is a side elevational view of a tank type vacuum cleaner with an adapter in accord with the invention in operative position therein, certain parts being broken away to more clearly illustrate the construction and function of the adapter.

With particular reference to FIG. 1, the vacuum cleaner is designated therein by the numeral 1 and includes a generally cylindrical casing 2 which is supported on casters 3 for easy movement over a floor in the conventional manner. The casing 2 is provided with an apertured cover plate 5, the aperture being in the form of a port 4 through which air is admitted when the cleaner is in operation. An open ended cylindrical element 6 is mounted on the cover plate and passes inwardly through the aperture 4 to confine the path of the intake air and to extend the intake opening inwardly thereof. Element 6 also functions as a connector which receives the connector end 41 of a manually operated hose attachment.

Casing 2 is divided by intervening plate 9 into an upper chamber 7, in which dust and dirt particles are normally collected by air filtration on strainer 11, and a lower chamber 8, which serves as a housing for motor 20. Plate 9 is integrally formed with the upper portion of the casing side wall 10 and has a centrally located aperture 16 which interconnects the upper and lower chambers 7 and 8 and which serves as an air exhaust or suction port for dust chamber 7.

The bag type dust strainer 11 is composed of conventional air filtering material and is suspended within the dust chamber 7 to collect and filter dust and dirt particles entrained in the air admitted through the intake port 4. The suspension of the filter bag 11 in the dust chamber is accomplished in a conventional manner by means of an annular suspension ring 12 which is mounted around the upper edge of wall 10. The ring is provided with a depending lip portion 14 and the upper edge of the strainer is suitably attached thereto. Above the lip 14, the ring 12 is provided with an outwardly opening peripheral slot 13 which is adapted for fitting engagement with an inwardly projecting flange located around the upper edge of the casing wall 10. The suspension ring 12 is made of flexible material such as rubber to facilitate removal of the strainer from the wall for purposes of emptying dust and dirt collected therein. Ring 12 is sufficiently soft or yielding to function as a gasket which seals the joint between the cover plate 5 and the upper edge of the casing wall 10, thus preventing the passage of air therethrough.

Air admitted to dust chamber 7 is exhausted through suction port 16. A coarse grill member 17 is disposed in the dust chamber 7 and suitably mounted on plate 9 about the suction port. The grill member 17 serves to protect the suction port 16 from clogging by the lower portion of the strainer 11 when air is being sucked therethrough by fan 18. Suction fan 18 is mounted on drive shaft 19 of motor 20 and the motor and fan are suspended from plate 9 immediately below exhaust port 16 and within the motor housing portion 8 of casing 2 by means of motor supporting bolts 21 secured to and depending from the raised portion of plate 9. Motor 20 is connected to a suitable electrical power source by means of electrical conductor 22 and is controlled in its operation by means of a manually operated toggle switch 23 which is inserted in the circuit and mounted on the lower portion of casing wall 10.

The motor housing portion 8 of the casing 2 has a bottom plate 26 and an inwardly projecting flange 24 along the upper edge of its side wall. Flange 24 underlies and is secured to plate 9 by means of screws 25. Bottom plate 26 serves as a bottom closure for the casing 2 and the motor housing portion thereof and is integrally formed with the wall of the housing 8. Aperture 27 is provided in plate 26 and functions as an exhaust port for air sucked into the motor housing 8 by fan 18.

In accord with the invention and to enable the use of the vacuum cleaner for collecting liquids entrained in air taken into the apparatus through intake port 4, an adapter in the form of a water-impervious bag 30 is suspended in the dust chamber 7 in a manner such that the intake air and water entrained therein enter the waterproof bag 30 and are caused therein to take a tortuous path to escape therefrom. As such the water is thrown against the walls of the waterproof bag 30 and is collected therein whereas the air escapes from the bag through the bag opening and proceeds downwardly to the suction port 16 between the exterior of the waterproof bag and the casing wall 10. To assure the passage of the intake air into the water-impervious bag 30, the cylindrical connector element 6 preferably extends downwardly through the bag opening and discharges the intake air directly into the bag. A plurality of radially opening holes 47 are preferably provided at the lower extremities of the connector so that a portion of the intake air proceeds laterally from the connector while the major portion of the water continues downwardly through the open end of the connector and impinges on the portion of the bag immediately therebelow.

The water-impervious bag 30 is held open and in the path of the intake air by means of an annular suspension member 32 which connects with and in turn is suspended from connector element 6 by means of rod like element 33. As shown in FIG. 1 the rod element 33 passes through diammetrically opposite holes 36 in connector element 6 and connects at its opposite ends with annular suspension member 32. Annular suspension member 32 surrounds and has a greater diameter than the intake port and a lesser diameter than the dust strainer suspension ring 12. The bag suspension member 32 is mounted concentrically to dust bag suspension ring 12 and in spaced relationship from the members defining dust chamber 7 so that air discharged within the water-impervious bag may proceed outwardly through the bag opening and thence over the suspension ring 32 and between the ring 32 and the inner face of chamber 7 from where it may pass downwardly through strainer 11 to suction port 16.

Figure 2:
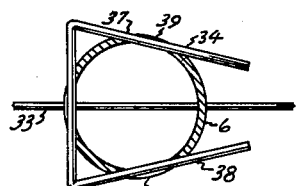
FIG. 2 is a sectional view along the line 2—2 of FIG. 1 showing details of the hose connector assembly.

In FIG. 1 it will be seen that the cylindrical connector element 6 is provided with an upper flange 33' which rests on the surface of cover plate 5 adjacent to the aperture 4 and that clamp 34 is provided as a means for preventing vertical movement of connector 6 and a means for securing the hose connector end member 41 within the cylindrical element 6. Clamp 34, as shown in FIG. 2, has opposite legs 37 and 38 which fittingly engage within horizontally disposed slots 39 and 40 which are located in opposite sides of the connector element 6 immediately below the inner face of cover plate 5. These legs may be spread apart to release the clamp from the connector 6 and the slots 39 and 40 are so disposed in the connector that a portion of each leg extends within the hollow portion of the cylindrical connector. These portions of the legs are adapted to engage the peripheral slot 42 in the end member 41 of the hose to secure the hose to the casing when the end member is inserted in the outer end of the connector element 6.

Figures 3, 4:
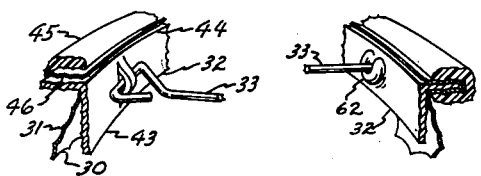
FIG. 3 is a fragmentary view illustrating certain components as a bag suspension assembly employed in the embodiment shown in FIG. 1.
FIG. 4 is another fragmentary view illustrating other portions of the components shown in FIG. 3.

FIG. 3 illustrates the means employed in the embodiment shown in FIG. 1 for securing the water-impervious bag 30 to the annular suspension member 32. Waterproof bag suspension member 32 includes a rigid annular element 43 which has an outwardly extending top flange portion 44 and further includes a resilient annular member 45 which has an inwardly facing slot adapted to fittingly receive the flange 44. The upper edge portion 46 of the water-impervious bag 11 is securely disposed between flange 44 and resilient member 45. Because of its resiliency member 45 may be easily removed for replacement of bag 30 in the event the bag is damaged. Rod 33 is pivotally hinged at one end to the rigid annular element 43 as shown in FIG. 3. As shown in FIG. 4 the other end of rod 33 fits into C-shaped socket 62. By disengaging the end of rod 33 from socket 62, the rod may be withdrawn from the connector element 6 and thereby freed of its connection with the cover plate 5 of casing 2.

Figures 5, 6:
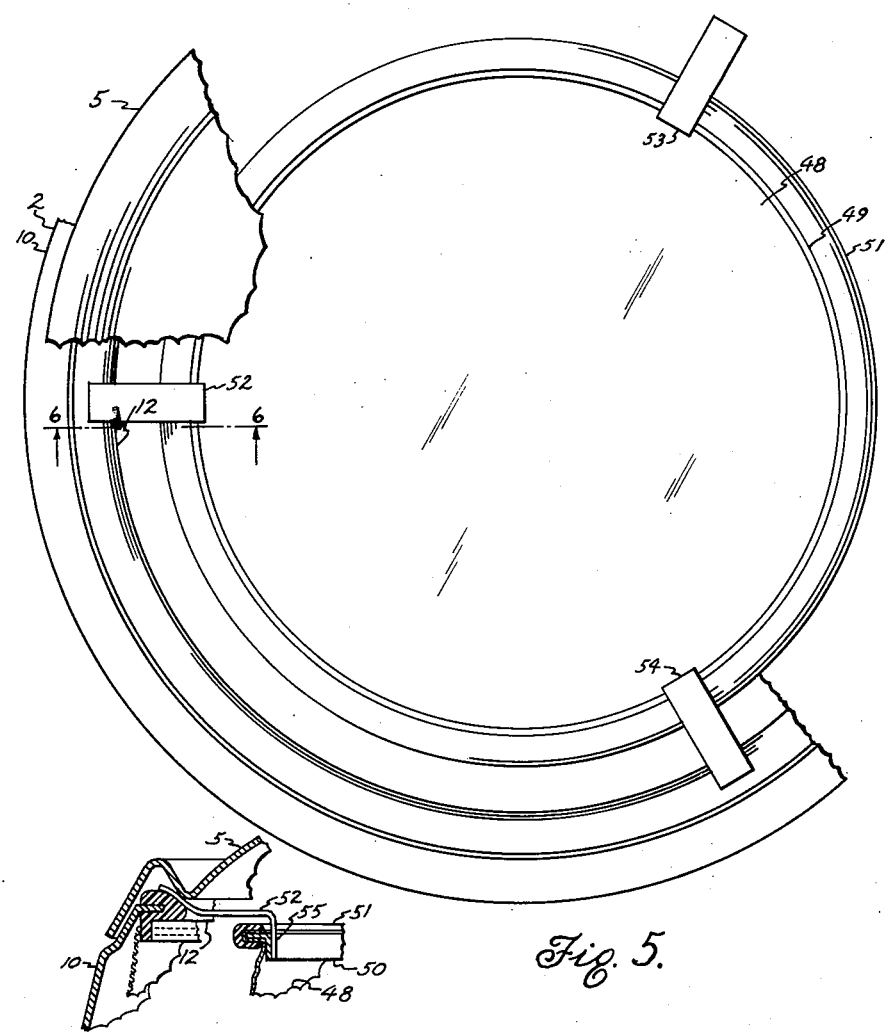
FIG. 5 is a top view of a modified embodiment of the invention.
FIG. 6 is a fragmentary side view, partially broken away and in section, of the embodiment shown in FIG. 5 together with portions of the vacuum cleaner illustrating the bag suspension assembly.

FIG. 5 illustrates another embodiment of the invention which employs a slightly different suspension assembly from that employed in the embodiment shown in FIG. 1. The water-impervious bag in FIG. 5 is designated as 48 and the bag is secured to annular suspension member 49 in the same manner that bag 30 is secured to annular suspension member 32. Thus annular suspension member 49 includes a rigid annular element 50 and a resilient annular member 51 which correspond in design and function in the same manner as elements 43 and 45 respectively of the embodiment shown in FIG. 1. Instead of rod 33, however, the embodiment shown in FIG. 5 is provided with radially extending and circumferentially spaced ears 52, 53 and 54 which rest upon the upper edge of wall 10 and accordingly suspend the water-impervious bag therefrom.

As shown in FIG. 6 by the fragmentary view illustrating the position of ear 52 when the embodiment illustrated in FIG. 5 is suspended in the cleaner shown in FIG. 1, the ears are arranged and adapted to rest on the strainer suspension ring 12 which forms the gasket between the cover plate 5 and casing wall 10 of the vacuum cleaner. The ears have respective downwardly projecting legs such as leg 55 which are suitably connected in circumferential spaced relationship to the inner face of the rigid annular element 50. The ears project radially from above the annular suspension member 49 and thence angle upwardly to respective resting positions on annular ring 12. Cover plate 5 rests on top of the ears and fixes them firmly in place when clamped to the wall by a suitable clamp secured to the wall of the casing. The bag suspension assembly shown in FIGS. 5 and 6 also provides a space between the upper edge of the waterproof bag 48 and casing 2 which enables air received through the intake port to proceed outwardly through the opening in the bag and thence between the water-impervious bag 48 and the casing wall to the suction port.

The function of the waterproof bag attachment is best understood by reference to FIG. 1. When the motor 20 is operating, fan 18 is withdrawing air from chamber 7 through suction port 16 and this air is being expelled from the cleaner 1 through exhaust port 27. The withdrawal of the air from chamber 7 creates a partial vacuum therein and accordingly air is drawn into the dust chamber 7 through intake port 4. When the cleaner is thus operating and being employed to draw water into the dust collection chamber 7, the air and entrained water pass into the chamber 7 in the confined downward path defined by connector 6 and indicated generally by arrow 57. As the air and entrained water reach the lower extremities of connector 6, a portion of the air passes outwardly through the holes 47 in connector element 6 as generally indicated by arrows 58, whereas the balance of the air proceeds outwardly through the lower open end of the connector element 6 and in the direction indicated by arrows 59. Because of its higher density, which prevents it from following the tortuous path of the air indicated by arrows 57, 58 and 59, the major portion of the water passes directly downward through the open lower end of connector element 6 and impinges upon the portion of the bag 30 which is opposite thereto and thereafter collects in a pool at the lower end of the bag 30. The remainder of the water falls out of suspension as the air proceeds in the direction of arrows 60 and collects at the bottom of the water-imprevious bag since the velocity of the air at these points in the dust chamber 7 are greatly reduced due to the greatly increased cross sectional area of the air path thereat. Thereafter, the air minus the entrained water proceeds out of the open end of bag 30 and over the annular bag suspension member 32 in the direction of arrows 61 from whence it passes through the dust strainer 11 to the suction port 16. Ultimately the air is expelled from the cleaner through exhaust port 27.

From the foregoing it will be evident that the opening in the water-impervious bag is so disposed in the dust collection chamber that it lies in the path of incoming air issuing through the intake port. As such the air together with water entrained therein enters the bag and is caused by the confining walls thereof to reverse its direction and thereby take a tortuous path to escape from the bag. The upward path which the air takes within the bag is of greater cross sectional area than the cross sectional area of the intake port and accordingly the gases travel upwardly at a lesser velocity than that velocity at which they enter the bag. As such the water which remains entrained in the air after the air makes its initial entry into the bag falls out of suspension and collects in the bottom regions of the bag. The upper portion of the waterproof bag, that is the portion thereof which is adjacent to the opening therein, is suspended in a manner such that the gases after passing over the bag suspension member pass downwardly along the outside of the upper portion of the bag for a length at least sufficient to pass through the dust strainer after which they then pass to the suction port.

It will be noted that the waterproof bag attachment is wholly suspended within the casing and is thereby shielded from external view and in no way changes the external appearance of the cleaner. The bag may be composed of any suitable water-impervious material such as rubber, plastics such as polyethylene or other water-impervious materials.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. For use with a household vacuum cleaner of the tank type having walls defining a dust chamber, a dust strainer mounted within said chamber, an air intake port for admitting air into said chamber in a predetermined path and a suction port for withdrawing said air from said chamber through said strainer, a waterproof flexible sheet material bag having an upper edge portion defining a top opening, said bag being adapted and arranged to be disposed in said chamber with its said opening in the path of said admitted air, annular mounting means attached to said edge portion for maintaining said bag in an open condition and adapted and arranged to be disposed in outwardly surrounding relation to said path of admitted air, and means attached to said mounting means and adapted and arranged to contact said chamber walls for supporting said annular mounting means spacedly within said dust strainer and inwardly of the walls of said chamber, said mounting means and said bag being smaller than the interior of said chamber thereby to provide air space outwardly around said mounting means and bag within said chamber, whereby air and entrained water admitted through said intake port enter said bag, said water collects therein and said air passes therefrom through portions of said opening located between said intake port and said mounting means and thence through said air space and through said strainer to said suction port.

2. The combination with a household vacuum cleaner of the tank type having a chamber with an upright cylindrical wall a cover plate resting on an upper edge portion of said wall, said plate being provided with an air intake port communicating with said chamber, an annular gasket interposed between said cover plate and said wall edge portion, a dust strainer bag connected to and suspended from said gasket within said chamber and an exhaust port communicating with said chamber, of a water-impervious flexible sheet material bag having an edge porition defining an opening thereinto, rigid annular means connected to said edge portion of said water-impervious bag and being of lesser diameter than said gasket, and ears connected to and extending outwardly from said rigid means resting on said gasket beneath said cover plate for suspending said bag within said chamber with the bag opening in the path of air admitted through said intake port.

3. For use with a household vacuum cleaner of the tank type having a casing defining a walled chamber and which includes a cover plate mounted on an upper edge portion of said wall provided with an air intake port communicating with said chamber through said cover plate, and a suction port communicating with said chamber, a water impervious flexible sheet material bag having an edge portion defining an opening thereinto, a ring member having a diameter less than the diameter of said upper edge portion connected to said bag edge portion for maintaining said bag in an open condition, and support means having a portion adapted and arranged to be retained interposed between said wall edge portion and said cover plate and said means being supportingly connected to said member for suspending said bag with its opening in the path of air admitted through said air intake port whereby air and entrained water entering said opening of said bag from said intake port pass into said bag, said water collects in said bag and said air passes outwardly of said opening to said suction port.

4. In a household vacuum cleaner of the tank type which has a casing which includes a cover palte and defines a walled chamber enclosed at the top by said cover plate, an intake-port-defining element extending through said cover plate and into said chamber, and air exhausting means communicating with said chamber, the combination therewith of a water-impervious flexible sheet material bag having an edge portion defining an opening into said bag, an annular member having an exernal diameter less than the internal diameter of said chamber connected to said edge portion to maintain said bag in an open condition, and means connected to said intake port element and to said annular member for mounting said member in said chamber in position surrounding the path of air entering said intake port and with said bag depending from said member, whereby air and entrained water enter into said bag through its said opening from said intake port, said water collects in said bag and said air passes outwardly of said opening to said suction port.

5. An impervious bag assembly adapted for use with a household vacuum cleaner of the tank type for separating and collecting water entrained with the air entering said cleaner, said cleaner having a chamber, an air intake port communicating with said chamber above the bottom thereof, and air exhausting means including an exhaust port communicating with said chamber, said bag assembly comprising a water-impervious flexible sheet material bag having an edge portion defining an opening thereinto, an annular member connected to said edge portion for maintaining said bag open at said edge portion, said annular member and bag being smaller than said chamber, and rigid means connected to said annular member for suspending said bag within said chamber with said opening in the path of intake air entering said intake port and with said annular member and bag spaced inwardly from the interior of the chamber to provide an air space in said chamber outwardly of said annular member and bag, whereby said intake air passes into said bag through said opening and thence outwardly through said opening and thence through said air space to said exhaust port, and entrained water in said intake air is collected in said bag.

6. An assembly for adapting a household vacuum cleaner of the tank type having a casing defining a dust collection chamber, said casing having an air intake port communicating with said chamber above the bottom thereof and an air suction port communicating with said chamber spacedly from said intake port, for receiving air with water entrained therein through said intake port, said assembly comprising a water-impervious flexible sheet material bag having an edge portion defining an opening into said bag, an annular member connected to said edge portion to maintain said bag in an open condition, and means connected to said annular member and engaging said casing for suspending said bag within said chamber with said bag opening in the path of air entering said intake port, said annular member and bag being smaller than said chamber and being positioned therein spacedly from interior portions thereof to provide an air space outwardly of said annular member and bag within said chamber, whereby air and entrained water enter said opening of said bag from said intake port, said water collects in said bag and said air passes outwardly of said opening through said air space to said suction port.

References Cited in the file of this patent

UNITED STATES PATENTS

| | | |
|---|---|---|
| 682,811 | Paterson | Sept. 17, 1901 |
| 956,784 | Templin | May 3, 1910 |
| 1,199,713 | Rakestraw | Sept. 26, 1916 |
| 1,526,384 | Simpson | Feb. 17, 1925 |
| 2,306,212 | Gerstmann | Dec. 22, 1942 |
| 2,321,653 | Carlson | June 15, 1943 |
| 2,608,268 | Gerber | Aug. 26, 1952 |
| 2,616,517 | Beck | Nov. 4, 1952 |
| 2,731,103 | Ortego | Jan. 17, 1956 |
| 2,794,513 | Hultberg et al. | June 4, 1957 |

FOREIGN PATENTS

| | | |
|---|---|---|
| 11,842 | Great Britain | May 23, 1903 |
| 786,443 | Great Britain | Nov. 20, 1957 |